(12) United States Patent
Quinn (10) Patent No.: US 11,518,443 B1
(45) Date of Patent: Dec. 6, 2022

(54) CONTROL SYSTEM FOR ROTATING THRUST-PRODUCING APPARATUS

(71) Applicant: Quinn Aerospace Inc., Valencia, CA (US)

(72) Inventor: Steven P. Quinn, Valencia, CA (US)

(73) Assignee: Quinn Aerospace Inc., Valencia, CA (US)

( * ) Notice: Subject to any disclaimer, the term of this patent is extended or adjusted under 35 U.S.C. 154(b) by 0 days.

(21) Appl. No.: 17/349,130

(22) Filed: Jun. 16, 2021

(51) Int. Cl.
  *F04D 29/32* (2006.01)
  *B62D 25/08* (2006.01)
  *F04D 17/02* (2006.01)
  *F04D 25/14* (2006.01)
  *B60K 5/00* (2006.01)

(52) U.S. Cl.
  CPC ......... *B62D 25/081* (2013.01); *F04D 17/025* (2013.01); *F04D 25/14* (2013.01); *F04D 29/326* (2013.01); *B60K 2005/006* (2013.01)

(58) Field of Classification Search
  CPC ...... F04D 29/326; F04D 17/025; F04D 25/14; B26D 25/081
  See application file for complete search history.

(56) References Cited

U.S. PATENT DOCUMENTS

| | | |
|---|---|---|
| 1,374,256 A | 4/1921 | Van Asperen |
| 1,786,017 A | 12/1930 | Matta |
| 1,850,993 A | 3/1932 | Chester |
| 1,971,820 A | 8/1934 | Jackson |
| 2,176,542 A | 10/1939 | Nicholson |
| 2,432,775 A | 12/1947 | Lennon |
| 2,659,178 A | 11/1953 | Van Hartesveldt |
| 2,922,277 A | 1/1960 | Bertin |
| 2,990,137 A | 6/1961 | Willis |
| 3,124,200 A | 3/1964 | Wilson |
| 3,181,811 A | 5/1965 | Maksim, Jr. |
| 3,182,929 A | 5/1965 | Lemberger |
| 3,274,410 A | 9/1966 | Boivie |
| 3,278,115 A | 10/1966 | White et al. |
| 3,359,908 A | 12/1967 | Toma |
| 3,824,028 A | 7/1974 | Zenkner et al. |
| 4,047,832 A | 9/1977 | Sforza |
| 4,419,049 A | 12/1983 | Gerboth et al. |
| 4,566,699 A | 1/1986 | Cucuzza |
| 4,666,373 A | 5/1987 | Sugiura |
| 5,328,333 A * | 7/1994 | Quinn ...................... B63H 1/16 416/185 |
| 2020/0370562 A1 * | 11/2020 | Lee ....................... F04D 29/384 |

* cited by examiner

*Primary Examiner* — Sabbir Hasan
(74) *Attorney, Agent, or Firm* — Kelly & Kelley, LLP (57) ABSTRACT

A rotating thrust-producing apparatus having a control system includes a rotatable foil having opposite first and second faces and a plurality of spaced apart fins occupying a periphery thereof. A pressure control assembly includes a first adjustable control surface disposed adjacent to a first face of the foil so as to be selectively movable over the fins of the foil. The pressure control assembly may include a second control surface disposed adjacent to the second face of the foil and which may be adjustable. As the foil is rotated, and the at least one adjustable control surface is moved over fins of the foil, a fluid pressure imbalance is created, causing a thrust in the direction of the pressure deficit.

17 Claims, 10 Drawing Sheets

CONTROL SYSTEM FOR ROTATING THRUST-PRODUCING APPARATUS

BACKGROUND OF THE INVENTION

The present invention generally relates to devices for producing thrust by rotation in a fluid, such as air or water. More particularly, the present invention relates to a rotating thrust-producing apparatus control system which selectively creates an imbalance of fluid pressure acting on opposite faces of a circular foil to cause it to move in the direction of the pressure deficit.

The most common device for producing axial thrust by rotation in a fluid, such as air or water, is in the form of the so-called screw propellers. Screw propellers are widely used for aircraft and marine propulsion. Three-blade propellers have become particularly popular for larger aircraft, while four-blade propellers have been extensively used for marine propulsion.

The axial thrust produced by a screw propeller depends upon the degree of vacuum created on the surface of the blade on the side of the direction of its travel because of movement of the blade through the fluid at a certain angle to the general plane of rotation of the blade and on the area of the blade at which such partial vacuum or reduced pressure is caused to act. The faster the rotation of the propeller blades, the greater the degree of vacuum created to produce axial thrust. However, screw propellers are limited in both the speed of rotation and/or in the number of blades beyond a certain limit as in spite of the increase in the degree of vacuum, the fluid pressure from the opposite side begins to decrease in a degree nullifying the beneficial effect of the increased vacuum.

In view of these limitations, propeller devices have been proposed which attempt to increase the effective area on which the fluid pressure acts for producing the axial thrust as compared with screw propellers. An example is found in U.S. Pat. No. 3,124,200 which discloses a disc-like alternative to the standard screw propeller.

U.S. Pat. No. 5,328,333 discloses a propeller-like circular foil for producing thrust in an axial direction when rotated. When connected to a source of power and rotated at high speed, the circular foil efficiently produces thrust in an axial direction. The thrust may be increased by increasing the rotational speed of the foil. However, this patent utilizes a single fixed plate control system, wherein the magnitude of the force applied to the pressure foil can only be controlled by varying the rotational speed of the pressure foil, where high rotational speed means more force and low rotational speed means less force.

Accordingly, there is a continuing need for a control system for a rotating thrust-producing apparatus which enables the magnitude of the force applied to the pressure foil to be controlled not only by the varying rotational speed of the pressure foil, but also in ways that will enable the pressure foil to act on an attached vehicle to speed up, slow down, brake, or even change directions. The present invention fulfills these needs, and provides other related advantages.

SUMMARY OF THE INVENTION

The present invention is related to a control system for a rotating thrust-producing apparatus. The control system generally comprises a rotatable foil having opposite first and second faces and a plurality of faced apart fins occupying a periphery thereof. A pressure control assembly includes a first adjustable control surface disposed adjacent to the first or the second face of the foil. The control surface is selectively movable over the fins of the foil. The pressure control assembly may include a first control surface disposed adjacent to the first face of the foil and a second control surface disposed adjacent to the second face of the foil. At least one of the first and second control surfaces is adjustable and selectively movable over the fins of the foil.

As the foil is rotated, fluid is discharged from a space between adjacent fins radially away from a center portion of the foil, and as at least one adjustable control surface is moved over the fins of the foil, fluid disposed adjacent to at least one adjustable control surface and radially inward of the fins is redirected from flowing between the fins, such that the fluid is discharged from the spaces between the fins at a rate faster than fluid can be replenished, creating a fluid pressure imbalance and causing the foil to move in the direction of the pressure deficit.

At least one of the first and second control surfaces may comprise a plurality of louvers that are selectively opened and closed.

At least one of the first and second control surfaces may comprise a plurality of blades selectively movable centrally towards one another and a central axis of the control surface to uncover the fins and peripherally away from each other and towards a periphery of the control surface to cover the fins. First and second plates may be disposed over opposite surfaces of the blades. The blades are slidably connected to the first and second plates. An actuator, including an extendable lever attached to the first plate or the second plate, for rotating the first or second plate in a first direction to move the blades centrally or a second direction to move the blades peripherally.

At least one of the first and second control surfaces may comprise a plurality of swing blades attached to a pin plate and selectively swiveled open and closed to form an iris aperture and be moved over or away from the fins of the foil.

The first control surface may comprise a first plate disposed over the first face of the foil and having a diameter less than that of the foil. The first plate is selectively moveable over the first face of the foil to cover or be moved away from the fins of the foil. The second control surface may comprise a second plate having a diameter substantially matching the diameter of the foil and disposed over the second face of the foil.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a rotating thrust-producing apparatus having a control system. The control system of the present invention enables a rotating thrust-producing apparatus, such as a propeller-like circular foil connectable to a power source for rotating the foil to impart varying degrees of thrust in an axial direction, the opposite axial direction, or even in different directions or along different planes.

The inventor of the present invention is also the inventor of the rotating thrust-producing apparatus disclosed in U.S. Pat. No. 5,328,333, the contents of which are hereby incorporated by reference. This patent discloses a fixed control plate attached to either the outer stationary frame of a pressure foil or to the spinning pressure foil itself. The plate completely covers only one side of the pressure foil's fins and prevents air, or any other ambient fluid medium that the pressure foil is operating within, from entering between the fins or gaps of the fins, thus forming a partial vacuum, or lower pressure, on the vacuum side of the plate and acting as a reaction surface that bears the force exerted by the ambient fluid, or higher pressure, on the atmospheric side of the plate to cause the foil to move in the direction of the pressure deficit. However, in this fixed control plate system disclosed in this patent, the thrust is unidirectional and the magnitude of the force applied to the pressure foil can only be controlled by varying the rotational speed of the pressure foil, where high rotational speed results in more force and low rotational speed results in less force. What is lacking in this patent is the ability to alter the magnitude of the force applied to the pressure foil by means other than varying the rotational speed, the ability to brake, or change directions.

Figure 1:
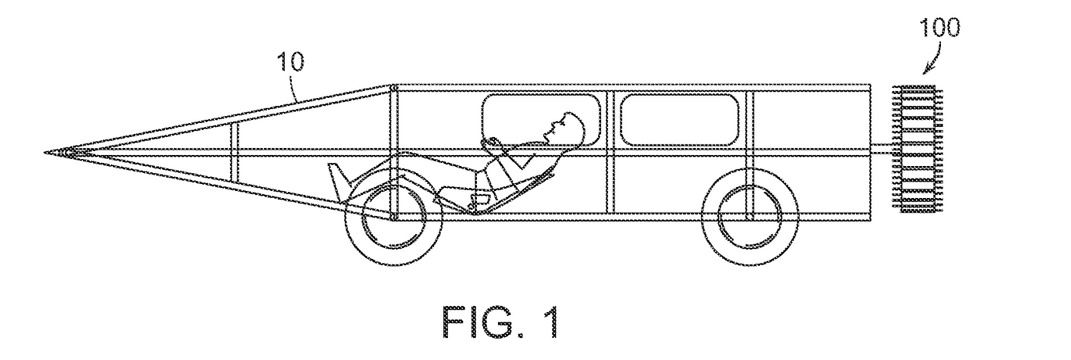
FIG. 1 is a diagrammatic illustration of a vehicle having a control system embodying the present invention coupled thereto.

With reference to FIG. 1, an exemplary vehicle 10 is shown having a rotating thrust-producing apparatus having a control system 100, in accordance with the invention. The control system 100 of the present invention enables the magnitude of the force applied to a pressure foil thereof, and thus to the attached vehicle, to vary, to reverse the force, or to change the direction of the force, such that the vehicle 10 can turn into different directions.

Figure 2:
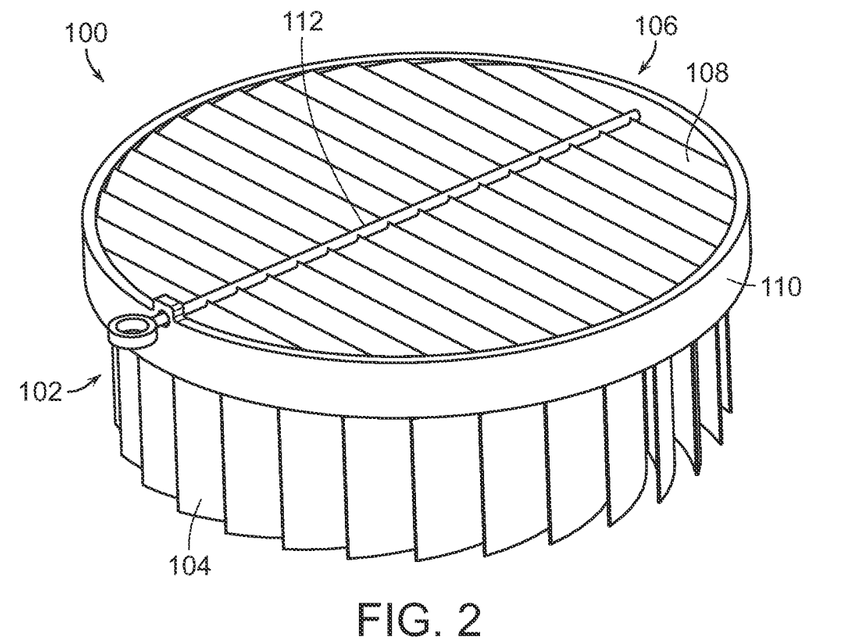
FIG. 2 is an upper perspective view of a louver control system embodying the present invention in a closed state.
Figure 3:
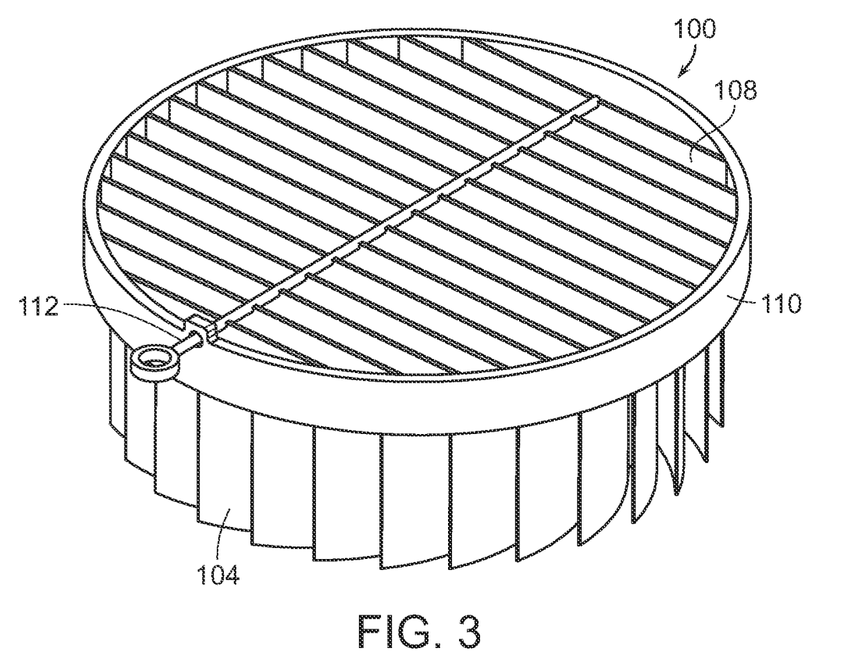
FIG. 3 is an upper perspective view similar to FIG. 2, but in an open state
Figure 8:
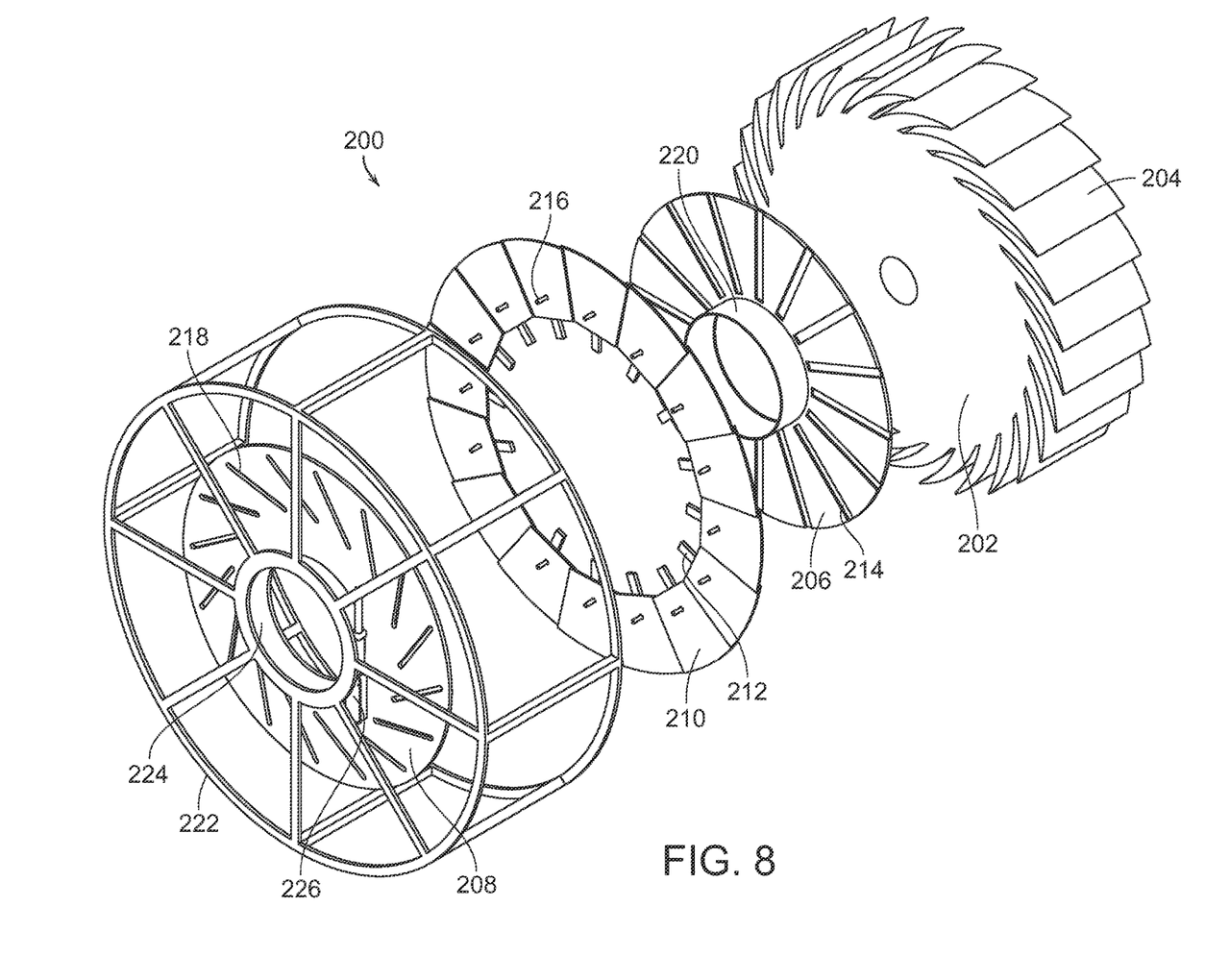
FIG. 8 is an exploded perspective view of a slide blade control system embodying the present invention

With reference now to FIGS. 2 and 3, a rotating thrust-producing apparatus including a control system 100 embodying the present invention is shown. A rotatable foil 102 has a plurality of spaced apart fins 104 that occupy a periphery thereof. Typically, as illustrated, the foil 102 is generally circular. Each fin extends from the foil at an angle of up to about ninety degrees relative to the respective tangent, and more preferably at an angle of from about thirty-five to fifty-five degrees. The fins may extend from a cylindrical hoop or from a foil body, as illustrated in FIG. 8. The fin positioning reduces resistance to spinning or rotation of the circular foil 102 while at the same time dispelling fluid molecules from the spaces between the fins 104 at a rapid rate.

As the foil 102 begins to spin, the fluid molecules between the fins 104 attempt to follow the spin. As the spin rotational speed is increased, the fluid molecules between the fins 104 will be thrown out as they will not be able to match the centripetal force needed to keep them in the circular motion. As the foil 102 is slowly rotated, the fluid molecules are sucked into the spaces between the fins 104 and then thrown out on the sides, and as the speed is increased, the time taken for the fluid to be sucked in and thrown out is decreased so that the average fluid molecule travelling at high speeds is deflected out before it has time to hit an upper surface between adjacent fins, creating a pressure deficit of fluid molecules that will strike such a surface above or below the fins, creating a deficit of fluid molecules and a pressure deficit that will create movement of the foil 102 in the direction of the pressure deficit.

Placement of a control surface adjacent to a face of the foil such that the control surface covers the fins 104 of the foil 102 permits a pocket of vacuum to occur within the spaces between the fins 104 as the foil 102 spins. As there is no vacuum on the opposite side of the control surface, there will be a net force generated towards the vacuum side.

The present invention may utilize a pressure control assembly 106 having a plurality of louvers 108 which are selectively closable, as illustrated in FIG. 2, to cover the fins 104 and opened, as illustrated in FIG. 3, so as to uncover the fins 104. The louvers 108 may be disposed within or pivotally attached to a stationary frame 110, such as the illustrated hoop. The louvers are selectively opened and closed using any suitable lever or mechanism, such as the illustrated actuator rod 112, wherein when the rod 112 is moved in one direction the louvers 108 are closed, as illustrated in FIG. 2, and when the rod 112 is moved in the opposite direction the louvers 108 are opened, as illustrated in FIG. 3.

When the control surface louvers 108 are closed, as illustrated in FIG. 2, they are in very close proximity to one side of the foil 102 and covering the fins 104. The louvers 108 can number from one to many, depending upon the size, configuration and application utilized. As mentioned above, the louvers 108 may be connected to the frame 110 so as to rotate, such as by means of a hinge pin or the like (not illustrated) such that when the actuator rod 112 is moved the louvers 108 will rotate and increasingly open or close.

When the louvers are fully closed, as illustrated in FIG. 2, as the pressure foil 102 rotates, air will evacuate from between the fins 104, but the air will only be drawn into the gaps between the fins from the side opposite the louvers 108 forming the control surface or the opposite side of the pressure foil 102. At the same time, the vacuum side of the system experiences partial vacuum, therefore a lower pressure will form on that side of the louver, and on the opposite side of the louver there is no evacuation of air hence that side of the louver remains at atmospheric pressure. This creates a pressure imbalance that results in a net force pushing from the atmosphere side of the louver (in FIG. 2 above the louvers 108) towards the vacuum side of the louvers 108 (in FIG. 2 the surface of the louvers adjacent to the foil 102). However, when the louvers 108 are rotated to a fully open position, as illustrated in FIG. 3, as the pressure foil 102 rotates, the air or other fluid that is evacuated from between the fins 104 is thrown out the side of the pressure foil 102, but ambient fluid is immediately drawn in from both sides of the pressure foil 102, as the fins 104 are exposed to ambient fluid, thus causing a zero net force on the pressure foil 102.

The amount of pressure deficit or differential, and thus force or thrust, will vary as the louvers 108 are moved from their fully closed position to their fully opened position. Thus, the foil 102 can be rotated at a constant speed but the adjustment of the louvers 108, creating an adjustable control surface adjacent to the face of the foil 102 will cause a maximum pressure differential or directional force when the louvers 108 are fully closed and an increasingly decreased pressure differential and thus thrust or force applied to the foil 102 as the louvers 108 forming the adjustable control surface are moved until they are moved to the fully open position, as illustrated in FIG. 3, when there is a net zero pressure differential or thrust or directional force applied to the foil 102. This enables the rotating thrust-producing apparatus, such as the rotatable foil 102, to have a varying magnitude of force applied thereto by adjusting the speed of rotation of the foil 102 and/or the position of the louvers 108, which will result in a vehicle 10 to which the system 100 is attached to having increased or decreased velocity.

Figure 4:
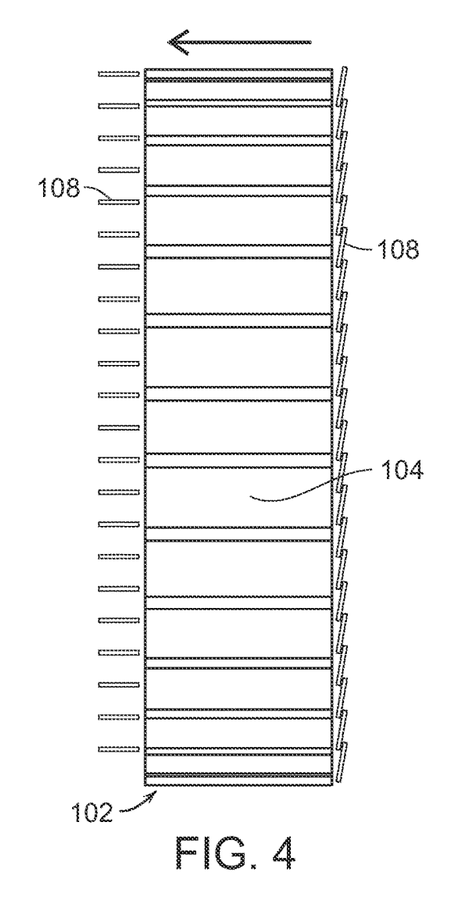
FIG. 4 is a diagrammatic side view of a louver control system embodying the present invention having louvers closed on a right side thereof.
Figure 5:
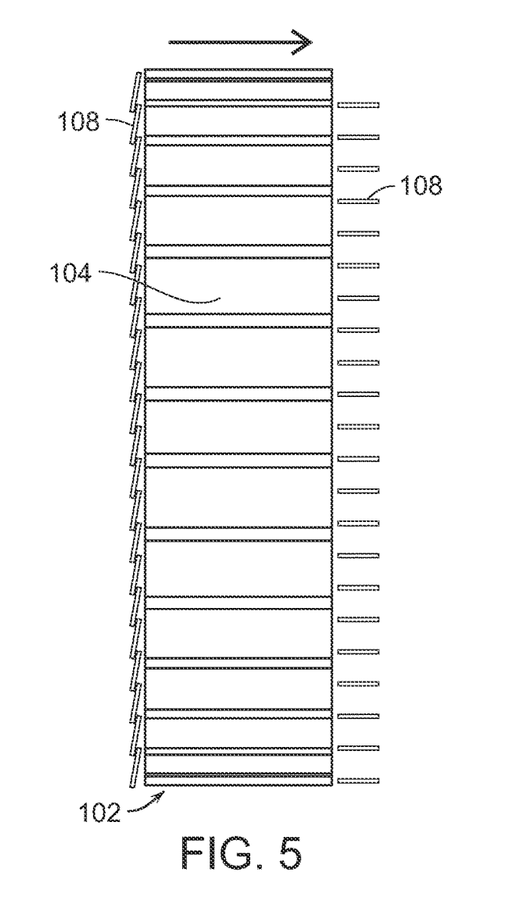
FIG. 5 is a view similar to FIG. 4, but illustrating the louvers of the control system closed on the left side, in accordance with the present invention.

With reference now to FIGS. 4 and 5, side views or a diagrammatic view of a rotatable foil 102 having spaced apart fins 104 with louvers 108 disposed adjacent to both the generally opposite first and second faces of the foil 102 are illustrated. The pressure control assembly may have first and second adjustable control surfaces comprised of louvers 108 disposed on both the first and second faces of the foil 102, or there may be two pressure control assemblies, each having a set of louvers 108 defining an adjustable control surface. It will be seen, as illustrated in FIG. 4, that when one set of louvers 108 are closed, such as on the right side of the foil 102 as illustrated in FIG. 4, while the other louvers 108 on the opposite face of the foil 102 are kept open, a pressure differential in the form of a vacuum will be created on the left, creating a thrust force to the left, as shown in the directional arrow in FIG. 4. However, if the louvers 108 on the left face are closed, as illustrated in FIG. 5 while the louvers on the generally opposite right face are kept open then the pressure deficit will be on the opposite side and thus the thrust or force will be to the right, as shown in the directional arrow of FIG. 5. Thus, by including a second adjustable control surface, such as the one or more louvers 108 on the generally opposite face of the foil 102 will enable control of the thrust or movement in two opposite directions, which enables both braking or even reverse motion to be applied to the rotating foil 102, and thus the vehicle 10.

With reference now to FIGS. 6 and 7, one or more pressure control assemblies can be designed so as to enable additional directional forces due to pressure deficits, enabling the pressure foil 102 to experience force movements in the direction of turning, such as turning left or right or the like. In the case of FIGS. 6 and 7, a similar arrangement as shown in FIGS. 4 and 5 is present, with louvers 108 being disposed on generally opposite first and second faces of the foil 102, but one-half of the louvers 108 on a given face are able to be closed while the other half are able to be kept open, or the louvers form two sets of louvers on each foil face which can be selectively opened and closed.

Figure 6A:
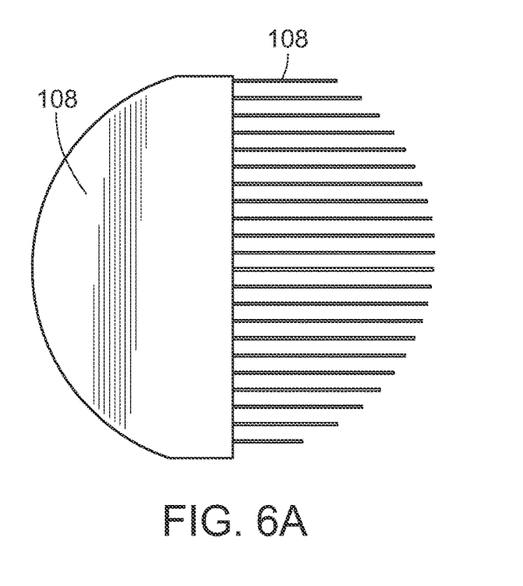
FIGS. 6A and 6B are diagrammatic illustrations of opposite side views of a louver control system with a portion of the louvers on each side closed for turning left.
Figure 6B:
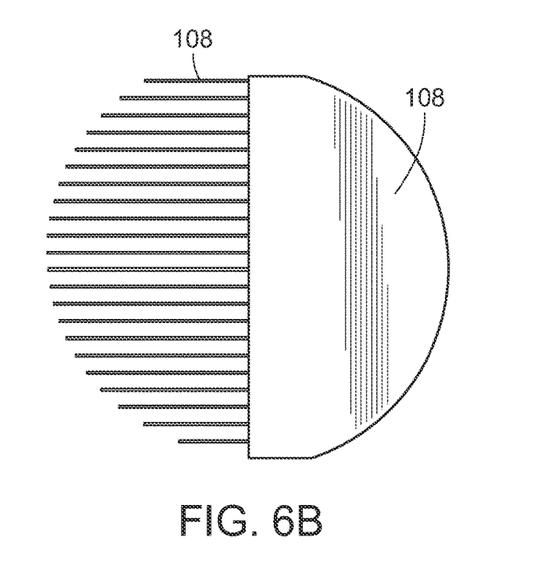

With this arrangement, as illustrated in FIGS. 6A and 6B, on the first face, or left face of the foil 102, one-half of the louvers 108 are closed, such as on the left side of the foil 102, while the other louvers 108, such as on the right side of the face of the foil 102 are kept open. On the generally opposite face of the foil, represented by the diagram in FIG. 6B, the left side louvers 108 are open while the right side louvers 108 are closed. The combination of these arrangements impart pressure deficits so as to provide a full left turn directional force to the rotating foil 102, and thus the vehicle 10. Slightly opening the closed louvers 108 on either or both sides of the foil 102 will still result in a left turn, but one of a different angle, such as a gradual left turn.

Such a "quad-louvered" control surface or valve system enables either the right and/or left sides of the control surface to be selectively opened or closed. The dual-louvered valve or control surface on the front of the foil 102 and the dual-louvered control surface or valve on the back of the foil 102 both work in a way that forces the vehicle 10 to turn left or right. As mentioned above, to turn left, the left side of the front louvered control surface is closed, and the right side of the front louvered valve or control surface is opened, as illustrated in FIG. 6A, while at the same time the left side of the back louvered control surface is opened and the right side of the back louvered valve is closed, as illustrated in FIG. 6B. As the foil 102 spins, it ejects air between the fins 104 radially out the sides of the foil 102, as described earlier, a similar pressure evacuation and net force effect occurs, except that in this left turn configuration the evacuating and atmospheric pressure net forces acts at the left side of the control surfaces pushes rearwards to the front left control surface, and the right side of the control surface pushes forward to the rear back surface, inducing a counter-clockwise torque (if looking down from the top of the vehicle 10) which will then cause the vehicle to turn left.

Figure 7A:
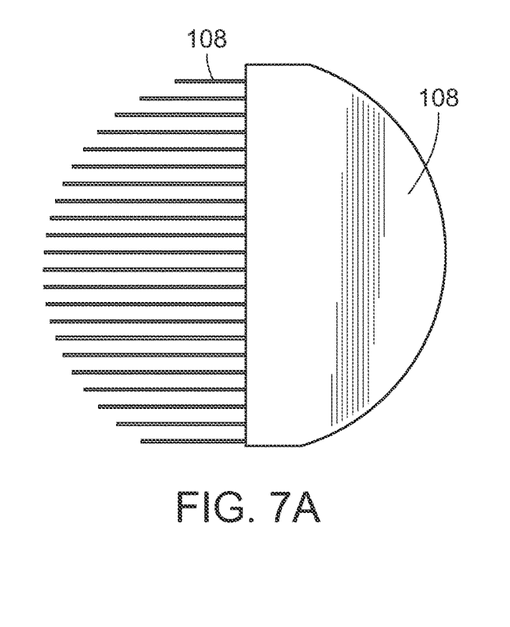
FIGS. 7A and 7B are diagrammatic illustrations similar to FIG. 6, but illustrating the opposite louvers closed so as to effectuate a right turn in accordance with the present invention.
Figure 7B:
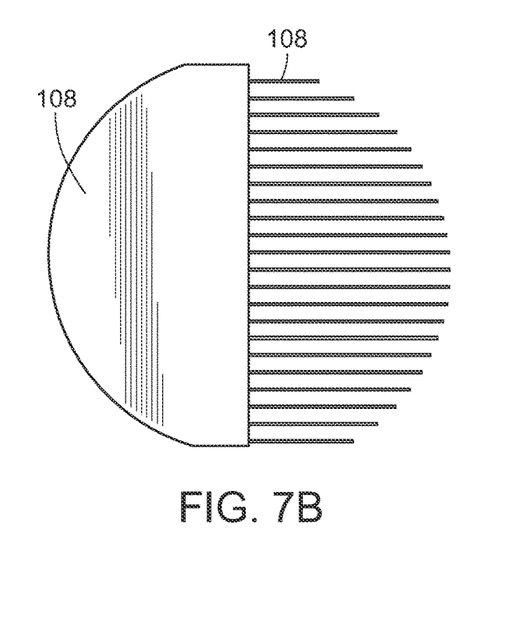

Likewise, with reference to FIGS. 7A and 7B, to turn right, the right side of the front louvered control surface or valve is closed and the left side of the front louvered control surface or valve is opened, as illustrated in FIG. 7A, while at the same time, the right side of the back louvered control surface is opened and the left side of the back louvered control surface is closed, as illustrated in FIG. 7B. As the foil 102 spins, it ejects air from between the fins radially out the sides of the foil 102, and as described earlier, a similar pressure evacuation and net force effect occurs here, except that in this right-turn configuration the evacuating and atmospheric pressure net forces act so that the right side of the control surface pushes rearward from the front right surface and simultaneously the left side of the control surface pushes forward on the back of the left control surface, inducing a clockwise torque (if looking down from the top of the vehicle 10) which then causes the vehicle to turn right. Once again, the degree or angle of the right turn can be adjusted by slightly opening or closing the louvers to adjust the control surfaces.

The pressure control assembly can have other arrangements other than the selectively opened and closed louver control surface arrangement illustrated and described above. For example, in FIGS. 8-10, a slide blade arrangement forming an iris aperture pressure control assembly as a control system for a rotating thrust-producing apparatus, generally referred to by the reference number 200, is shown. The system 200 includes a rotatable foil 202 having a plurality of spaced apart fins 204 at a periphery thereof, as described above. A slide plate 206 and a rotation plate 208 sandwich a plurality of slide blades 210 therebetween. A blade stick 212 is attached or otherwise associated with each slide blade 210. Each blade stick 212 slidably resides within a slide channel 214 of the slide plate 206. A blade peg 216 extends from a generally opposite surface of the slide blade 210 and is slidably insertable into a corresponding peg slot 218 of the rotation plate 208.

In the illustrated example, there are sixteen slide blades. However, the slide blades 210 can number from as few as two to many depending upon the size, configuration and application of the system utilized. The slide blade 210 and slide blade stick 212 move together freely in slide channel 214. As can be seen in FIG. 8, there is a slide channel 214 corresponding with each blade stick 212 and attached blade 210. These are radially spaced apart from one another, as shown. This enables the blades 210 to be extended outwardly or contracted inwardly to form an iris-like aperture and be disposed over and cover or be removed away from and uncover the fins 204 of the foil 202.

Figure 9:
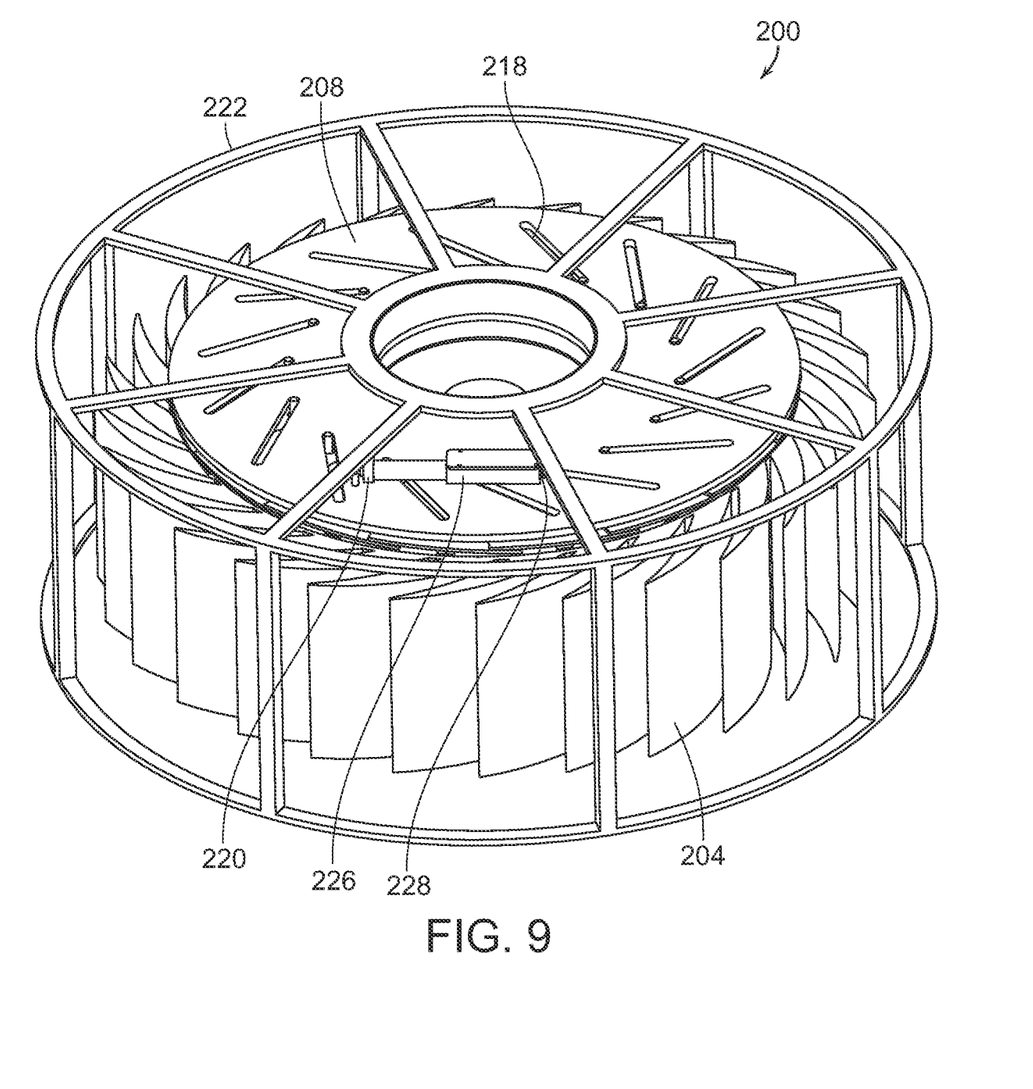
FIG. 9 is a perspective view of the slide blade control system of FIG. 8 with the blades moved to uncover fins of the foil.
Figure 10:
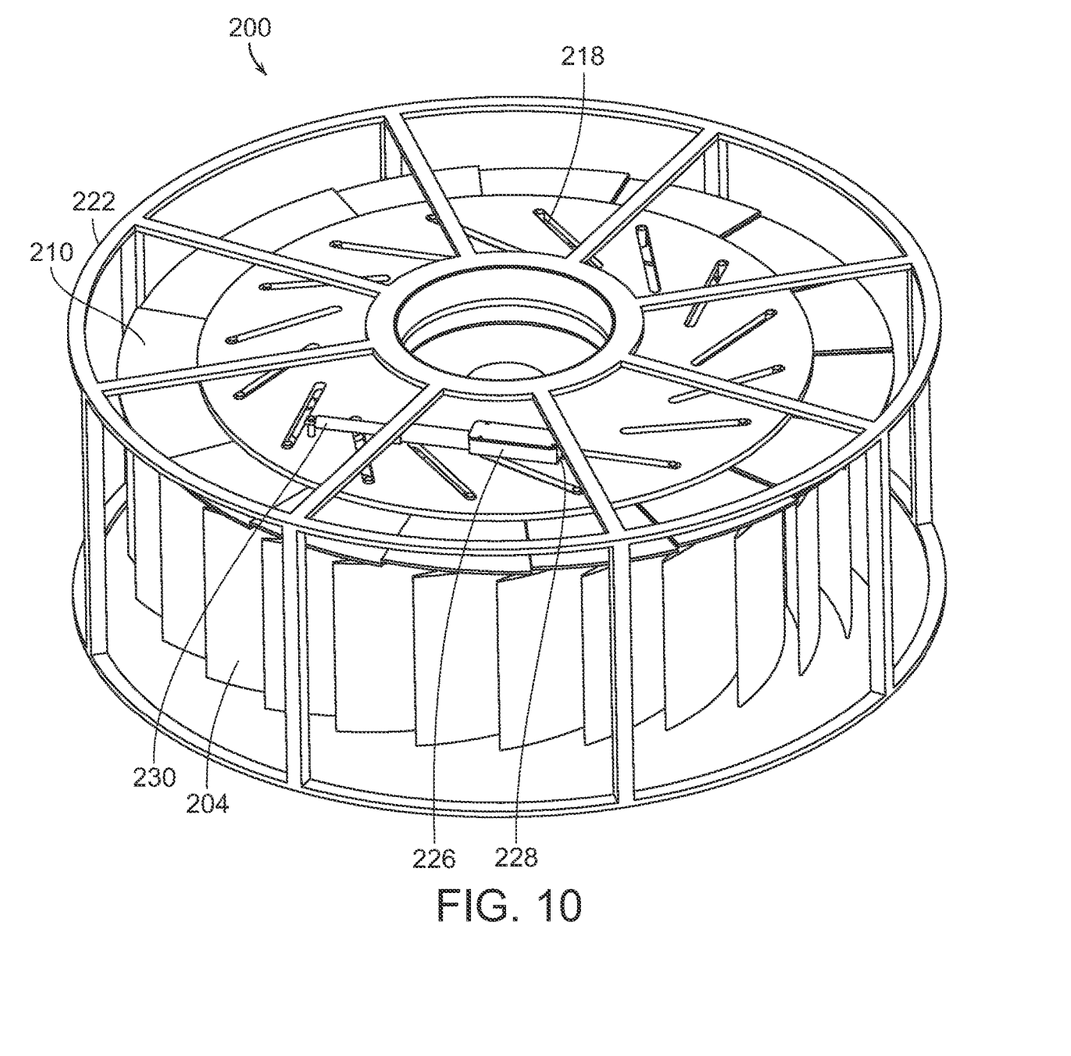
FIG. 10 is a perspective view similar to FIG. 9, but illustrating the blades in an extended position covering the fins, in accordance with the present invention.

The slide plate 206 includes, or is attached to, a center cylinder or hub 220 which is attached to a frame 222. For example, the center cylinder 220 of the slide plate may be attached to a central hub or cylinder 224 of the frame 222. The frame 222 may extend over and around the slide plate 206, rotation plate 208, and slide blades 210. The frame 222 may also extend over the rotatable foil 202, as illustrated in FIGS. 9 and 10. The frame is generally open or has large apertures so as to permit air, water or other fluid to flow in and out of the frame 222 as the foil 202 is rotated.

The rotation plate 208, as mentioned above, has a plurality of spaced apart elongated peg slots 218 which receive the pegs 216 therein. The rotation plate 208 has a central aperture and freely rotates about the center cylinder 220 of the slide plate 206. There is a peg slot 218 which corresponds to each peg 216 of each blade 210.

An actuator 226 is attached at one end thereof 228 to the frame 222. The opposite end of the actuator 230 is attached to the peg-slotted control rotation plate 208. The actuator 226 may comprise a telescoping member for the purpose of moving the rotation plate 208 in either a clockwise or counter-clockwise direction around the central cylinder 220. When the actuator is in a contracted position, as illustrated in FIG. 9, the blades 210 are also in a contracted position and moved away from so as to uncover the fins 204, also as shown in FIG. 9. In this position, with the fins uncovered, there is little to no pressure differential or deficit and thus net zero of thrust or force placed upon the iris 202 or assembly 200 and vehicle 10.

From the position illustrated in FIG. 9, wherein the actuator 226 and blades 210 are contracted, as the actuator 226 begins to extend, the end 220 of the actuator, or a lever attached thereto, pushes the peg-slotted control rotation plate 208 in a circular motion around the center cylinder 220. As the rotation plate 208 and its peg slots 218 rotate, the blade pegs 216 are forced from their innermost position, illustrated in FIG. 9, to their radially outward position, as illustrated in FIG. 10. This occurs due to the diagonally-lying peg slots as they rotate around the center cylinder, causing the blade pegs 216, along with their attached slide blades 210 and blade sticks 212 to slide radially outward along the respective stationary slide channels 214 of the slide plate 206. This causes the slide blades 210 to cover the fins 204 of the foil 202, as illustrated in FIG. 10. The slide blades 10 form an adjustable control surface, similar to the louvers 108, which can also be considered as a valve, to permit or prevent fluid from flowing through the foil 202 in the spaces between the fins 204.

As described above, as the rotation plate 208 rotates, either clockwise or counter-clockwise by virtue of the actuator 226 extending or contracting, this in turn forces each of the blades 210 to either move in, to a fully contracted, or valve opened, position or out, to a fully extended, or valve closed, position or to any partially opened or closed position therebetween. When the slide iris valve is fully opened, such that the blades 210 are in a fully contracted position, as illustrated in FIG. 9, as the pressure foil 202 is rotated, the fluid that is evacuated between the fins 204 is thrown out the side of the foil 202, but ambient fluid is immediately drawn in from above and/or below the faces of the foil 202, thus causing net zero force on the foil 202 and system 200.

However, when the slide iris valve is closed, such that the slide blades 210 are in a fully expanded or outward position over the foil fins 204, as illustrated in FIG. 10, as the foil 202 rotates, fluid will evacuate from between the fins, but the fluid will only be drawn into the gaps between the fins from the side of the foil 202 on which there is no control surface or an open control surface so as to expose the fins 204. At the same time, the vacuum side of the slide blade 210 experiences partial vacuum, therefore a lower pressure will form on that side of the slide blade 210. On the atmosphere side of the slide blade 210, there is no evacuation of air and that side of the blade remains at atmospheric pressure. This creates a pressure imbalance or pressure deficit that will result in a net force pushing from the atmosphere side of the slide blade 210 towards the vacuum side of the slide blade adjacent the fins 204 so as to cause the foil to move in the direction of the vacuum side or pressure deficit side. With reference to FIG. 10, this would result in the system 200 moving downwardly.

The degree of force or thrust will vary as the slide blades 210 are extended and retracted. Thus, the magnitude of the force can vary, resulting in a varying force, and hence velocity, imparted to an attached vehicle 10. Thus, once again, the velocity of the vehicle can be adjusted by either adjusting the rotational speed of the foil 202 and/or the position of the slide blades 210, as mentioned above. It is contemplated by the present invention that another adjustable control surface be disposed on the opposite face of the foil 202 so as to impart braking or even a reverse velocity or direction imparted to the foil 202, and thus to the attached vehicle 10. Such an adjustable control surface could be a second set of slide blades 210, with the accompanying slide plate 206 and rotation plate 208 and actuator 226 arrangement discussed and illustrated in FIGS. 8-10, or any other adjustable control surface, including those illustrated and described herein. When both adjustable control surfaces are moved away from the fins 204 of the foil 202, there will be a net zero pressure imbalance and thus a net zero force applied thereto. However, as one set of slide blades 210 are extended over the fins 204, a vacuum or pressure deficit will form on the opposite face of the foil 202, resulting in the foil, and thus the vehicle, being impelled in that direction.

Figure 11:
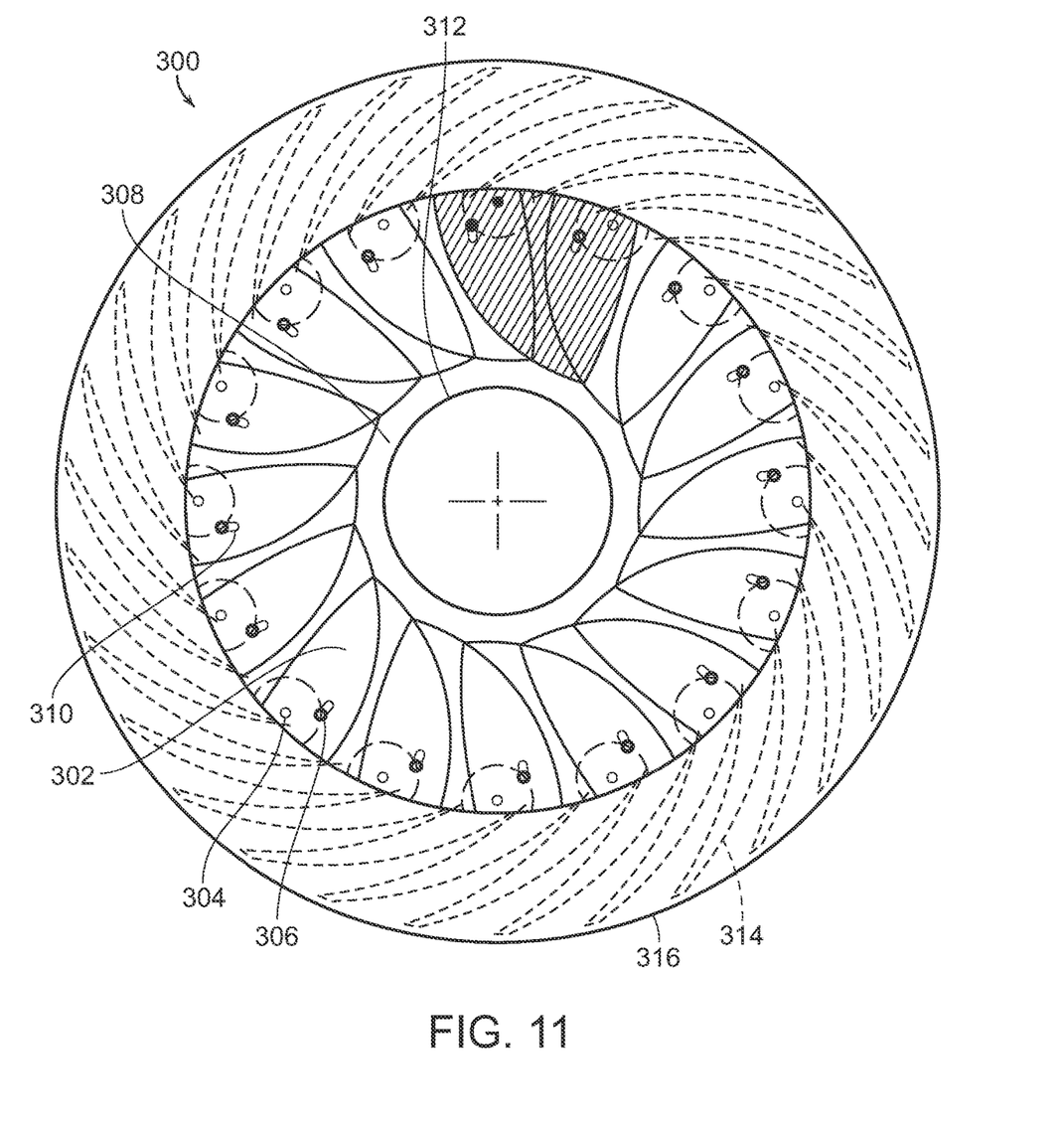
FIG. 11 is a diagrammatic view of a swing blade control system forming an aperture, illustrating the iris aperture in a substantially opened position.
Figure 12:
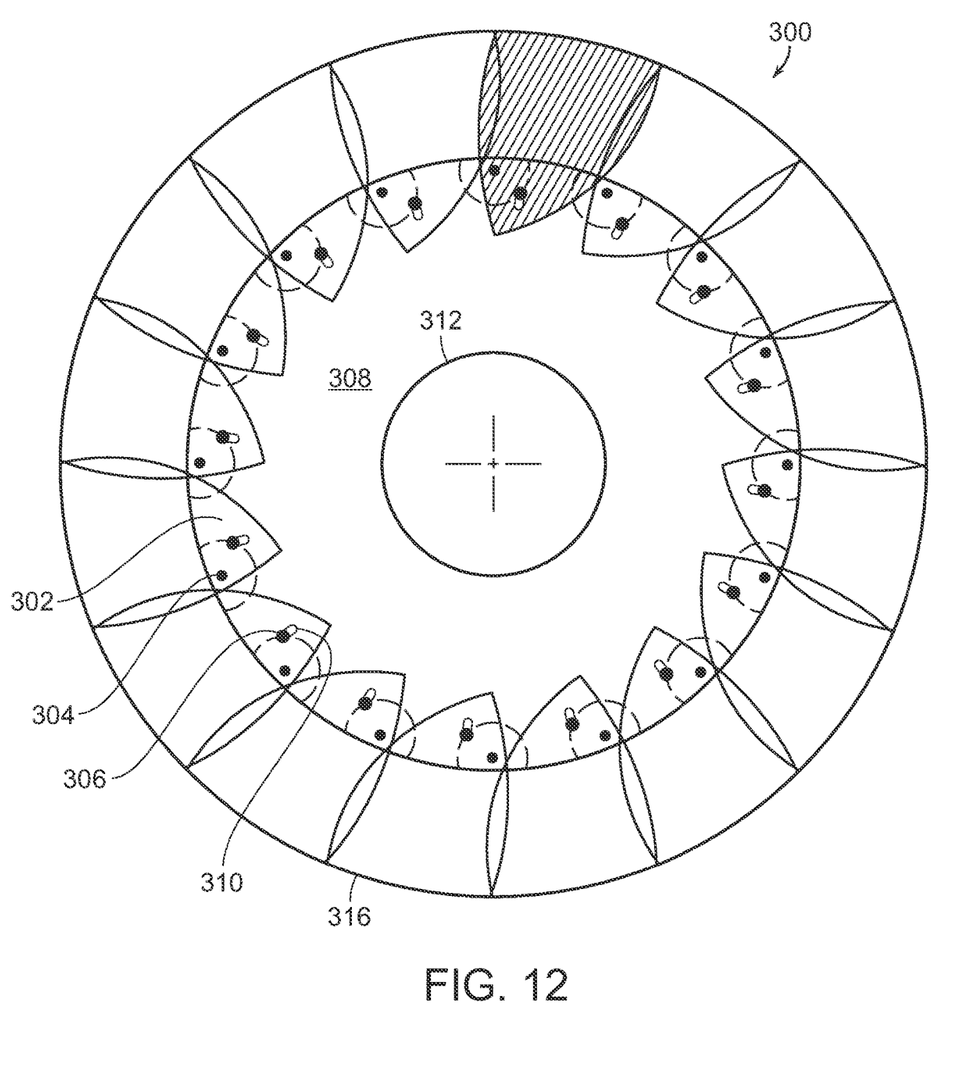
FIG. 12 is a diagrammatic view similar to FIG. 11, illustrating the swing blades swiveled to close the iris aperture and be disposed over the fins of the foil, in accordance with the present invention.

With reference now to FIGS. 11 and 12, another iris aperture or valve pressure control assembly of a control system, 300 of a rotating thrust-producing apparatus is shown. A plurality of swing blades 302 are each attached to a swivel pin 304. The swivel pins 304 are attached to a mount plate which is disposed below the swing blades 302. The swing blades 302 swivel open and closed around their respective swivel pins 304 in order to open and close.

Each swing blade 302 has a blade peg 306 projecting perpendicular to the swing blade that is used as a lever arm to swivel the swing blade 302 in an arc path, illustrated by the dashed circular lines. A rotation plate 308 has a plurality of slots 310 corresponding to the number of blades 302 and blade pegs 306 such that the pegs 306 can reside in a dedicated slot 310. The rotation plate fits over the top of all the swing blade pegs 306 so that when the rotation plate 308 rotates about the central cylinder 312 the peg slots 310 push against the blade pegs 306, thus forcing the swing blades 302 to swivel about the respective swivel pins 304, thereby causing each of the swing blades to open or close.

When the swing blades 302 are all open, as illustrated in FIG. 11, they are pulled towards the central cylinder 312 so as to move away and uncover the fins 314 of the spinning pressure foil. This allows ambient fluid to rush in between the gaps or spaces between the fins 314 of the spinning pressure foil through the opened swing iris valve assembly. When the swing blades 302 are closed or extended outwardly, as illustrated in FIG. 12, they prevent the ambient fluid from rushing in between the gaps or spaces between the fins 314 of the spinning pressure foil. This creates a pressure imbalance and applies a force in the direction of the pressure deficit.

The entire swing iris pressure foil control assembly is attached to an outer frame 316. The swivel blades 302 are disposed in close proximity to one face of the spinning pressure foil. It will be understood that the number of swing blades 302 can, in practice, number from two to many depending upon the size, configuration and application of the system utilized. Thus, while there are illustrated in FIGS. 11 and 12 sixteen swing blades 302, this is merely exemplary.

As described above, the peg-slotted control rotation plate 308 can be rotated either clockwise or counter-clockwise, such as by means of an actuator (not illustrated) which may extend and contract in similar function to the actuator 226 illustrated and described above with respect to FIGS. 8-10. The actuator extension or contraction action, in turn, forces each of the swing blades 302 to either swivel inward, to a fully contracted, or valve opened position, as illustrated in FIG. 11, or outward, to a fully extended, or valve closed, position illustrated in FIG. 12, or to any partially opened position therebetween.

When the swing iris valve assembly is fully opened, as illustrated in FIG. 11, and as the pressure foil spins its fins 314, the fluid is evacuated from between the fins and thrown out the side of the pressure foil. However, ambient fluid is immediately drawn in from either face of the pressure foil, thus causing zero net force on the pressure foil structure. However, when the swing iris valve or control surface is closed, as illustrated in FIG. 12, with the swing blades 302 extended outwardly over the fins 314 of the foil, as the pressure foil spins fluid will evacuate from between the fins but the replacing fluid will only be drawn into the gaps between the fins from the side of the pressure foil which does not have a control surface covering the fins. At the same time, the vacuum side of the swing blades 302 experiences a partial vacuum, therefore a lower pressure will form on that side of the swing blades 302, and on the atmosphere side of the swing blades there is no evacuation of fluid and that side of the swing blade remains at atmospheric pressure. This creates a pressure imbalance that results in a net force pushing from the atmosphere side of the swing blades towards the vacuum side of the swing blades. Similar to that described above, a second control surface, which could comprise the swivel blade arrangement illustrated and described in connection with FIGS. 11 and 12, or any other arrangement disclosed herein, could be used on the opposite face of the pressure foil so as to create braking or even reverse forces, as described above.

Figure 13:
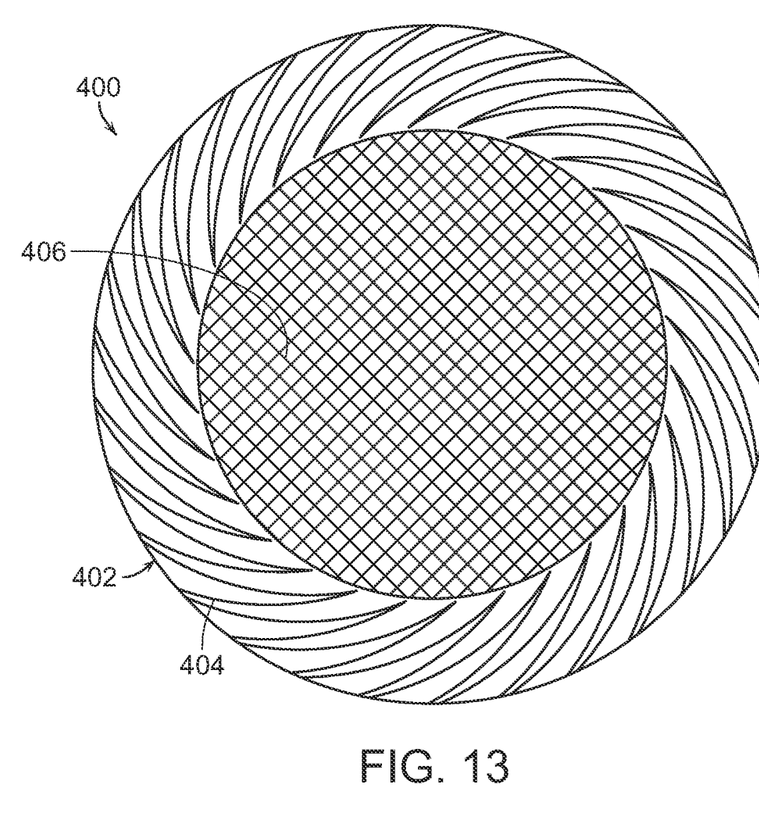
FIG. 13 is a top view of a control system embodying the present invention and having a plate disposed over a central portion of the foil, in accordance with the present invention.
Figure 14:
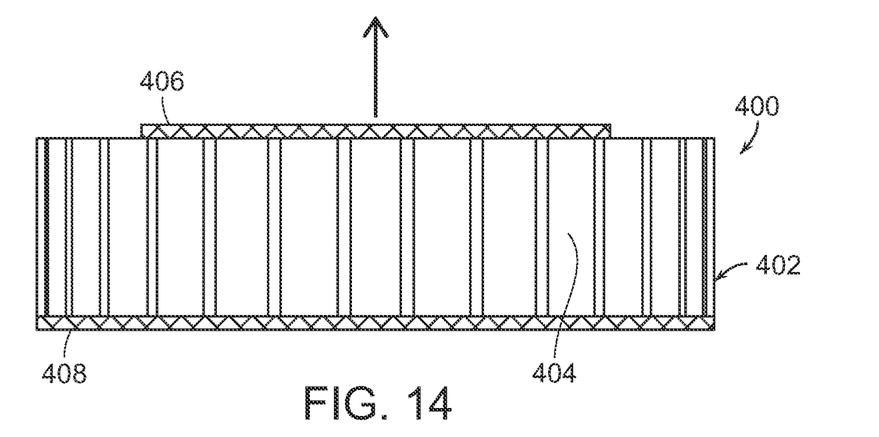
FIG. 14 is a side view of the arrangement of FIG. 13.
Figure 15:
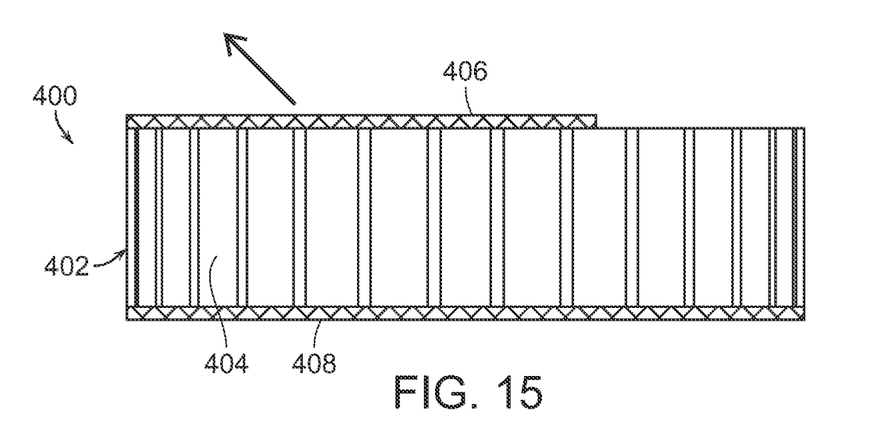
FIG. 15 is a side view similar to FIG. 14, but illustrating the plate moved to the left to alter the directional forces on the foil.
Figure 16:
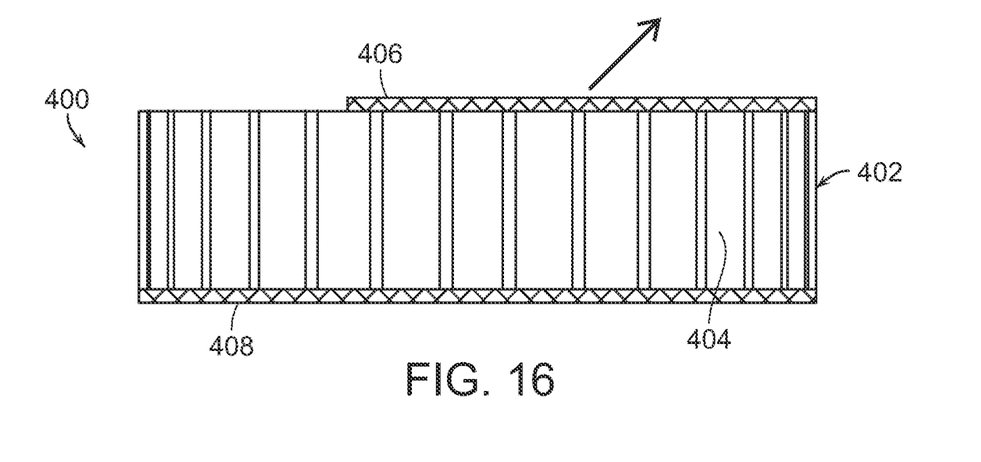
FIG. 16 is a side diagrammatic view similar to FIG. 15, with the plate moved to the right to alter the directional forces on the foil in accordance with the present invention.

Another rotating thrust-producing apparatus control system 400 is illustrated in FIGS. 13-16. This system 400 is able to control 360° directional force projections in a plane. A pressure foil 402 having fins 404 extending outwardly therefrom, as described above, has a first plate defining a first control surface, disposed over a first face of the foil 402 and having a diameter less than that of the foil 402, as illustrated in FIGS. 13-16. As can be seen in FIGS. 14-16, the first plate is selectively movable over the first face of the foil 402 so as to cover or be moved away from some or all of the fins 404 of the pressure foil 402. A second fixed control surface comprising a second plate having a diameter substantially matching the diameter of the pressure foil 402 is disposed over the second face of the foil 402, generally opposite the first plate 406. In the example shown in FIGS. 13-16, a horizontally-oriented pressure foil 402 is controlled to force a vehicle to move any of 360° relative to the normal of that horizontal plane by adjusting the position of the first or upper plate 406.

With reference to FIGS. 13 and 14, when the first variable valve plate 406 is in the neutral or center position, it only covers the inner diameter of the pressure foil fins 404, or may not cover the fins 404 whatsoever. However, the second plate 404 covers the pressure foil 402 and its fins 404, and thus as the foil 402 is rotated a pressure imbalance is created with a pressure deficit created above the second plate 408, causing the foil to move in the direction of the pressure deficit, indicated by the upward arrow in FIG. 14.

However, when the first adjustable or variable valve plate 406 is moved, such as to the "nine o'clock position" illustrated in FIG. 15, the pressure foil fins 404 are covered by the first plate 406, but only where the first plate 406 is placed, in this place in the nine o'clock position, while leaving the remaining fins open to the atmosphere. In this position, the pressure foiling effect occurs only in the areas where the fins are uncovered, in this case the "three o'clock position" which are open to the atmosphere on one face of the foil 402. This causes the pressure foil 402, along with what it is attached to including the vehicle, to tilt to the nine o'clock position, as shown by the directional arrow in FIG. 15 and to continue to more extremely tilt in the nine o'clock position until the first adjustable plate 406 is again moved to the neutral or center or other position.

Continuing with this example, with reference to FIG. 16, when moving the first plate 406 to the three o'clock position, as illustrated in FIG. 16, this forces the vehicle to begin to tilt to the three o'clock position, as illustrated by the directional arrow in FIG. 16, and to again move the vehicle horizontal to the ground surface, the variable plate 406 is first moved back to the nine-o'clock position (to reverse the 3 o'clock tilt), and then back to the neutral position, thus forcing the pressure foil system, including its attached vehicle, back into the horizontal or hover position. It will be appreciated that the first control plate 406 could be moved to the one o'clock position, three o'clock position, six o'clock position, nine o'clock position, or any position therebetween and cause a corresponding tilt in that direction. Moreover, the rotating foil 402 need not be in a horizontal position, but could be placed in a vertical position as well.

From the foregoing, it will be appreciated that the control system of the present invention can be used to push a sea, air or land vehicle forward, alter the magnitude of force or velocity of the vehicle, slow or brake the vehicle, or even move the vehicle in reverse. It is also possible, as described above, to cause the vehicle to turn left or to turn right. It is also possible, as described above, to push a vehicle downward or hover or upward or change the orientation of a vehicle, such as in air or in the water, such that the net thrust force is pointed in any 360° position relative to the vehicle and move the vehicle in the pointed direction. This can be accomplished by altering the speed of the rotatable foil and/or adjusting one or more control surfaces disposed adjacent to the first and/or second face of the foil so as to be movable over or away from fins of the foil.

Although several embodiments have been described in detail for purposes of illustration, various modifications may be made without departing from the scope and spirit of the invention. Accordingly, the invention is not to be limited, except as by the appended claims.

What is claimed is:

1. A control system for a rotating thrust-producing apparatus, comprising:
   a rotatable foil having opposite first and second faces and spaced apart fins occupying a periphery thereof; and
   a pressure control assembly including a first adjustable control surface disposed adjacent to an end of the fins, the first adjustable control surface being selectively movable over the fins of the foil so as to cover a plurality of the fins comprising less than all of the fins;
   wherein as the foil is rotated, fluid is discharged from a space between adjacent fins radially away from a center portion of the foil, and as the first adjustable control surface is moved over the plurality of fins of the foil, the fluid disposed adjacent to the first adjustable control surface and radially inward of the fins is re-directed from flowing between the fins, such that the fluid is discharged from spaces between the fins at a rate faster than the fluid can be replenished, creating a fluid pressure imbalance and causing the foil to move in the direction of the pressure deficit.

2. The control system of claim 1, including a second control surface disposed adjacent to an opposite end of the fins as the first adjustable control surface.

3. The control system of claim 2, wherein at least one of the first and second control surfaces comprises a plurality of louvers that are selectively opened and closed.

4. The control system of claim 2, wherein at least one of the first and second control surfaces comprises a plurality of blades selectively movable centrally towards one another and a central axis of the control surface to uncover the fins and peripherally away from each other and towards a periphery of the control surface to cover the fins.

5. The control system of claim 4, including first and second plates disposed over opposite surfaces of the plurality of blades, the plurality of blades being slidably connected to the first and second plates.

6. The control system of claim 5, including an actuator for selectively moving the plurality of blades including an extendable lever attached to the first plate or the second plate for rotating the first or second plate in a first direction to move the plurality of blades centrally or a second direction to move the plurality of blades peripherally.

7. The control system of claim 2, wherein at least one of the first and second control surfaces comprise a plurality of swing blades attached to a pin plate and selectively swiveled open and close to form an iris aperture and be moved over or away from the fins of the foil.

8. The control system of claim 2, wherein the first control surface comprises a first plate disposed over the first face of the foil and having a diameter less than that of the foil, the first plate being selectively movable over the first face of the foil to cover or be moved away from the fins of the foil.

9. The control system of claim 8, wherein the second control surface comprises a second plate having a diameter substantially matching the diameter of the foil and disposed over the second face of the foil.

10. A control system for a rotating thrust-producing apparatus, comprising:
    a rotatable foil having opposite first and second faces and spaced apart fins occupying a periphery thereof; and
    a pressure control assembly including a first control surface disposed adjacent to a first end of the fins and a second control surface disposed adjacent to a generally opposite second end of the fins, at least one of the first and second control surfaces being adjustable so as to be selectively movable over and cover at least a plurality of the fins of the foil and selectively movable to uncover at least a plurality of the fins of the foil;
    wherein as the foil is rotated, fluid is discharged from a space between adjacent fins radially away from a center portion of the foil, and as the first and/or second adjustable control surface is moved over to cover the at least a plurality of fins of the foil, the fluid disposed adjacent to the first and/or second adjustable control surface and radially inward of the fins is re-directed from flowing between the fins, such that the fluid is discharged from spaces between the fins at a rate faster than fluid can be replenished, creating a fluid pressure imbalance and causing the foil to move in the direction of the pressure deficit.

11. The control system of claim 10, wherein at least one of the first and second control surfaces comprises a plurality of louvers that are selectively opened and closed.

12. The control system of claim 10, wherein at least one of the first and second control surfaces comprises a plurality of blades selectively movable centrally towards one another and a central axis of the control surface to uncover the fins and peripherally away from each other and towards a periphery of the control surface to cover the fins.

13. The control system of claim 12, including first and second plates disposed over opposite surfaces of the plurality of blades, the plurality of blades being slidably connected to the first and second plates.

14. The control system of claim 13, including an actuator for selectively moving the plurality of blades including an extendable lever attached to the first plate or the second plate for rotating the first or second plate in a first direction to move the plurality of blades centrally or a second direction to move the plurality of blades peripherally.

15. The control system of claim 10, wherein at least one of the first and second control surfaces comprise a plurality of swing blades attached to a pin plate and selectively swiveled open and close to form an iris aperture and be moved over or away from the fins of the foil.

16. The control system of claim 10, wherein the first control surface comprises a first plate disposed over the first face of the foil and having a diameter less than that of the foil, the first plate being selectively movable over the first face of the foil to cover or be moved away from the fins of the foil.

17. The control system of claim 16, wherein the second control surface comprises a second plate having a diameter substantially matching the diameter of the foil and disposed over the second face of the foil.

\* \* \* \* \*